United States Patent [19]
Hanazumi et al.

[11] Patent Number: 6,046,519
[45] Date of Patent: Apr. 4, 2000

[54] STEPPING MOTOR

[75] Inventors: Hiroshi Hanazumi; Kazumasa Yoshida, both of Omiya, Japan

[73] Assignee: Mitsubishi Materials Corporation, Tokyo, Japan

[21] Appl. No.: 08/845,104

[22] Filed: Apr. 21, 1997

[30] Foreign Application Priority Data

Apr. 19, 1996 [JP] Japan ................................. 8-098882
Aug. 14, 1996 [JP] Japan ................................. 8-214811

[51] Int. Cl.⁷ ....................................................... H02K 1/00
[52] U.S. Cl. ............................ 310/49 R; 310/257; 310/89; 310/42
[58] Field of Search ............................ 310/49 R, 257, 310/89, 42

[56] References Cited

U.S. PATENT DOCUMENTS

| | | | |
|---|---|---|---|
| 3,508,091 | 4/1970 | Kavanaugh | 310/49 R |
| 4,012,652 | 3/1977 | Gilbert | 310/162 |
| 4,074,159 | 2/1978 | Robison | 310/154 |
| 4,471,246 | 9/1984 | Paillet | 310/42 |
| 4,695,419 | 9/1987 | Inariba | 264/259 |
| 4,985,669 | 1/1991 | Smith | 318/685 |
| 5,187,400 | 2/1993 | Kurata | 310/49 R |
| 5,698,918 | 12/1997 | Shinoda et al. | 310/89 |

FOREIGN PATENT DOCUMENTS 0 043 068  1/1982  European Pat. Off. .
2 245 107  12/1991  United Kingdom .

*Primary Examiner*—Nestor Ramirez
*Assistant Examiner*—Burton Mullins
*Attorney, Agent, or Firm*—Oblon, Spivak, McClelland, Maier & Neustadt, P.C.

[57] ABSTRACT

A stepping motor having high-precision torque formation and stepping angle is able to be produced at a low cost. Cylindrical elastic magnetic members, which cover a first and second set of yokes and have an inner diameter smaller than the outer diameter of the yokes, readily come in tight contact with the yokes and form strong magnetic circuits. The first and second sets of yokes are integrally formed into a bobbin through a nonmagnetic member. Pole teeth of the first set of yokes and pole teeth of the second set of yokes are arranged by shifting at a given angle to each other in the peripheral direction.

5 Claims, 10 Drawing Sheets

STEPPING MOTOR

BACKGROUND OF THE INVENTION

1. Field of the Invention

The present invention relates to stepping motors used as actuators of various control devices, and in particular, a stepping motor suitable for smoothly driving an indicator of a speed meter or the like.

2. Description of the Related Art

Stepping motors are widely used in various industrial fields. Particularly, they have been increasingly applied to rotational driving devices which require delicate movement.

In FIG. 6, numerals 31a and 31b represent cylindrical bobbins and coils 32 are wound on their peripheries.

These bobbins 31a and 31b, on which coils 32 are wound, are clamped by circular outer yokes 33a and 33b and circular inner yokes 34a and 34b.

On inner peripheries of the outer yokes 33a and 33b and the inner yokes 34a and 34b, pole teeth 36a, 36b and 36c and 36d are protrusively provided, and these outer yokes 33a and 33b and these inner yokes 34a and 34b are placed parallel with a predetermined shift along the periphery so that the pole teeth 36a and 36b and the pole teeth 36c and 36d engage each other at a central space section 37.

The pole teeth 36a and 36b and the pole teeth 36c and 36d form opposite magnetic poles, respectively, when the coils 32 are energized.

The first yokes 33a and 34a and the second yokes 33b and 34b are stacked up through a non-permeable spacer (not shown in the drawing) so that the inner yokes 34a and 34b face each other with a given space there between, and a rotor 39 having a shaft 38 to transmit a rotational driving force is inserted in the central space section 37 of the first yokes 33a and 34a and the second yokes 33b and 34b.

Multiple alternative polarization is performed on the outer periphery of the rotor 39, and the rotor 39 rotates by means of magnetic attractive force between the pole teeth 36a, 36b, 36c and 36d.

The stepping motor is assembled by rotatably supporting an end of the shaft 38 of the rotor 39 on a bearing stand 40a in the center of a plate 40, by covering a permeable cup frame 41 on the other end of the shaft 38, and rotatably supporting the other end of the shaft 38 with a bearing stand 41a provided in the cup frame 41.

The bobbins 31a and 31b have pole teeth inside their respective central cavities. In the stepping motor set forth in FIG. 6, the pole teeth of the bobbin 31a and the pole teeth of the bobbin 31b must be shifted at a given angle to each other when assembling them.

In such a configuration, however, magnetic balance of the bobbins 31a and 31b cannot be readily achieved during assembly, resulting in stepping angle errors of the shaft 38.

Since the cup frame 41 is formed by press working, its production cost is high and the cap tends to have a tapered shape. Therefore, the inside face of the cylindrical section comes in insufficient contact with the yokes 31a and 31b to achieve a precise torque generation and stepping angle. Further, an additional assembly step, such as cramping or welding, is required for contact of the cup frame with the yokes.

In order to rotate the rotor 39, a current flow is conducted to the coils 32 to energize the outer yokes 33a and 33b and the inner yokes 34a and 34b and to generate magnetic attractive force between the pole teeth 36a, 36b, 36c and 36d. Thus, the outer yoke 33a and the inner yoke 34a, and the outer yoke 33b and the inner yoke 34b must be magnetically coupled to form respective magnetic circuits.

The magnetic coupling has been conventionally achieved by a permeable cup frame 41. In this case, since the magnetic coupling is simultaneously performed between the first yokes 33a and 34b and second yokes 33b and 34b, a magnetic circuit of the first yokes 33a and 34a and a magnetic circuit of the second yokes 33b and 34b will lead each other through the cup frame to generate magnetic interference depending on the magnetizing patterns of the coils 32.

In detail, as set forth in FIG. 7(a), when the pole teeth 36b and 36c have the same polarity, they repel each other and thus no magnetic interference occurs. When the pole teeth 36b and 36c have opposite polarities due to change in the magnetizing pattern as set forth in FIG. 7(b), a magnetic field from the pole teeth 36b to the pole teeth 36c through the cup frame 41 is generated and magnetic interference occurs between the first and second yokes.

Since the magnetic interference depends on the change in magnetizing pattern, irregular rotation occurs due to the change.

When using this stepping motor for driving an indicator of a speed meter, the indicator does not move smoothly.

An idea for solving such problems involves two upper and lower cup frames 41 with each cup frame independently covering the outer peripheries of the first yokes 33a and 34a and the second yokes 33b and 34b. In this case, two expensive cup frames must be prepared. The improvement of the present invention is directed to overcoming such problems.

SUMMARY OF THE INVENTION

Accordingly it is an object of the present invention to provide a novel stepping motor having a high precision torque formation and stepping angle, capable of low cost production.

According to the present invention a stepping motor is provided which does not have an irregular magnetic intensity of the magnetic circuit formed by each yoke, has a high precision torque generation and stepping angle by effectively preventing magnetic interference between the first yokes 33a and 34b and the second yokes 33b and 34b, and can be produced at low cost.

In accordance with the present invention, a stepping motor comprises a rotor comprising a column magnet and a shaft attached along an axis of the column magnet; a bobbin comprising first yokes and second yokes, and first and second coils wound on these yokes, the bobbin covering said rotor; and an elastic plate magnetic member covering the bobbin, the plate magnetic member being formed into a cylinder having an inner diameter smaller than the outer diameter of the first and second yokes.

Also in accordance with the present invention, the cylindrical magnetic member is provided with holes positioned along a given band between the inner yokes to decrease the side surface area of a connecting section between said first yoke and said second yoke.

Furthermore, according to the present invention, a connecting section which magnetically connects one yoke with the other yoke is narrowed (the area decreases) due to holes formed in the cylindrical magnetic member, thus the magnetic flux flowing from one the yoke to the other yoke is decreased and magnetic interference between the first and second yokes can be suppressed.

The invention also provides that the cylindrical magnetic member is divided into a first cylindrical magnetic member to cover the periphery of the first yoke and a second cylindrical magnetic member to cover the periphery of the second yoke, and these cylindrical magnetic members are placed with a given gap there between. Therefore, one bobbin is not magnetically connected with the other bobbin, and magnetic interference between both bobbins can be suppressed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1A:
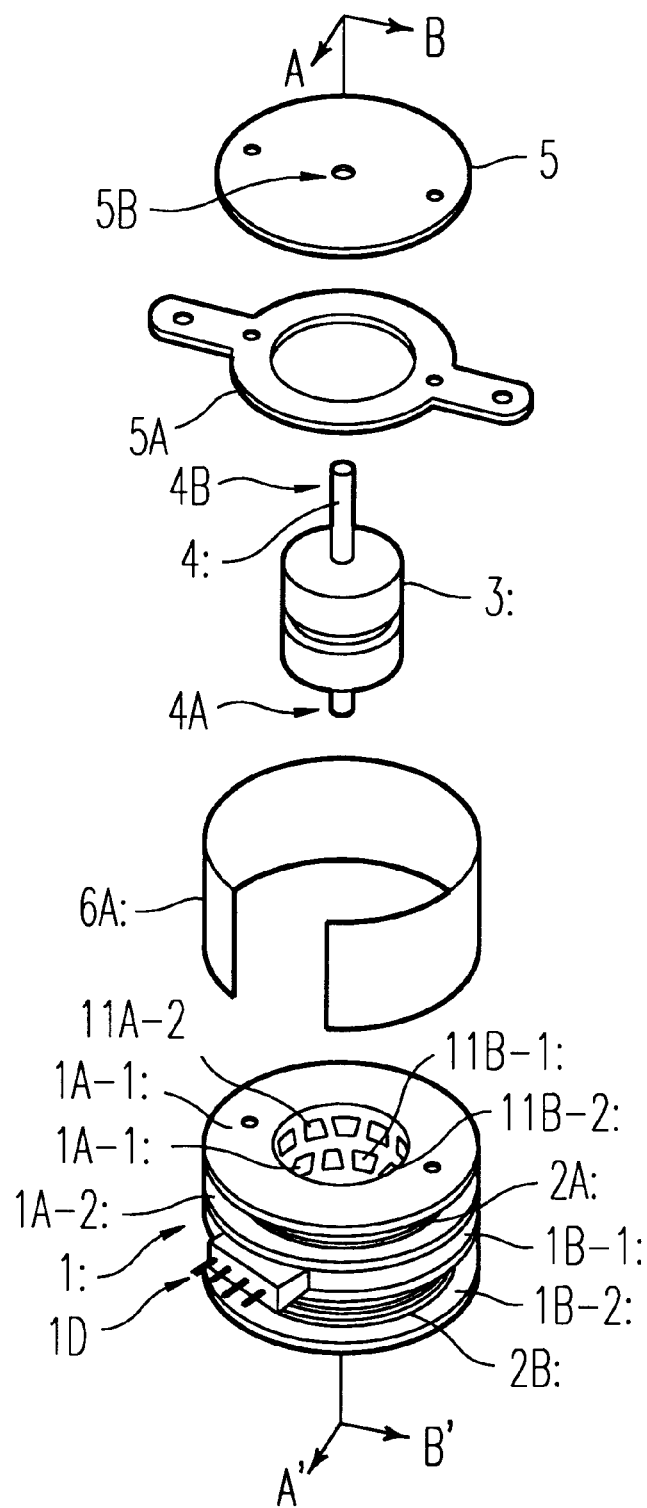
FIGS. 1(a) through 1(e) are assembly views illustrating stepping motor configurations in accordance with an embodiment of the present invention.
Figure 1B:
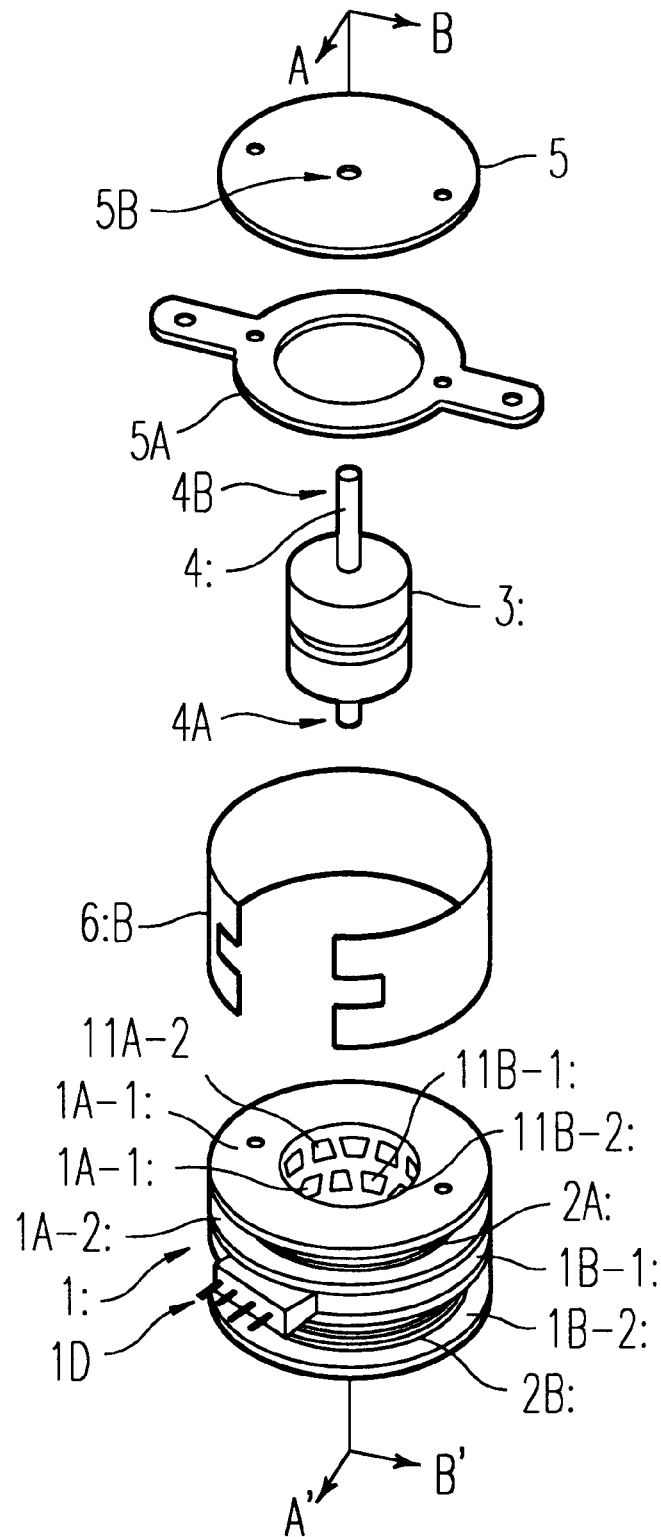
Figure 1C:
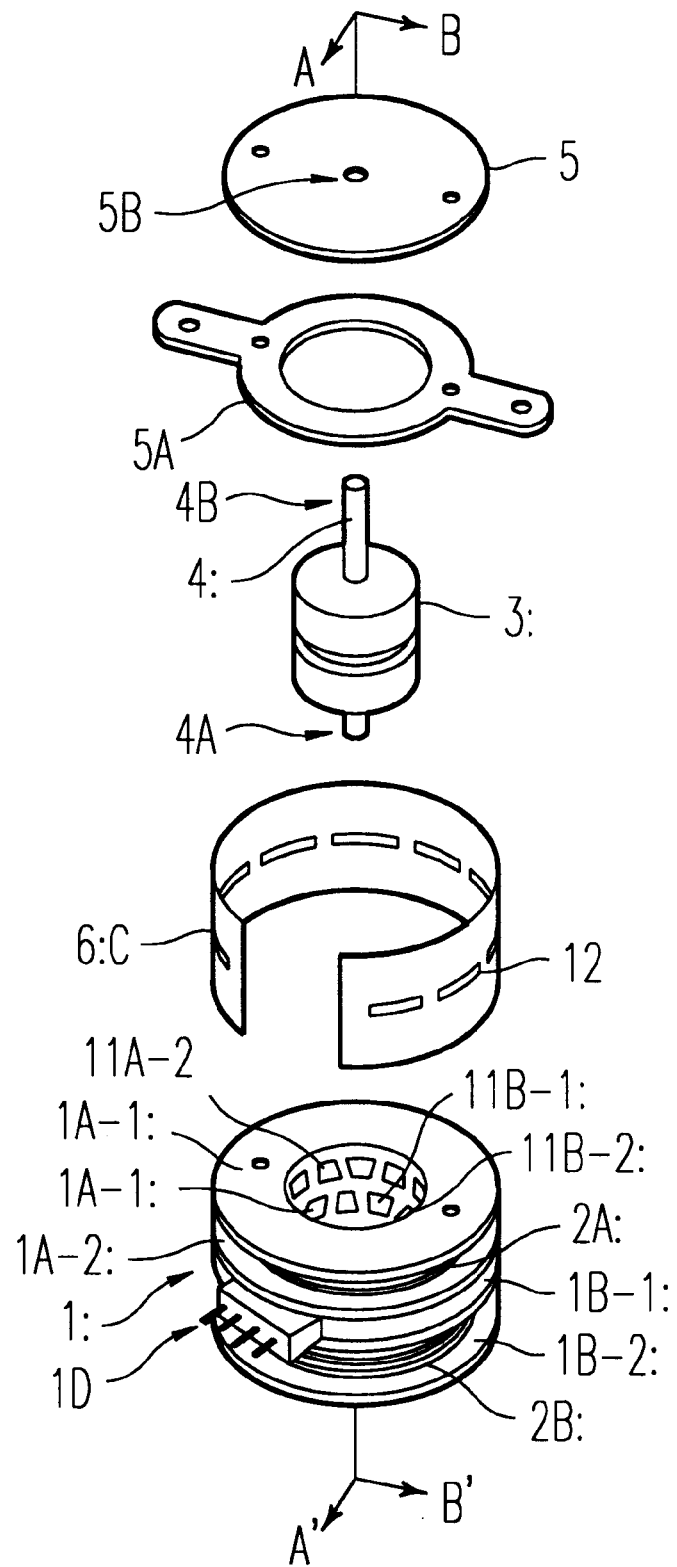
Figure 1D:
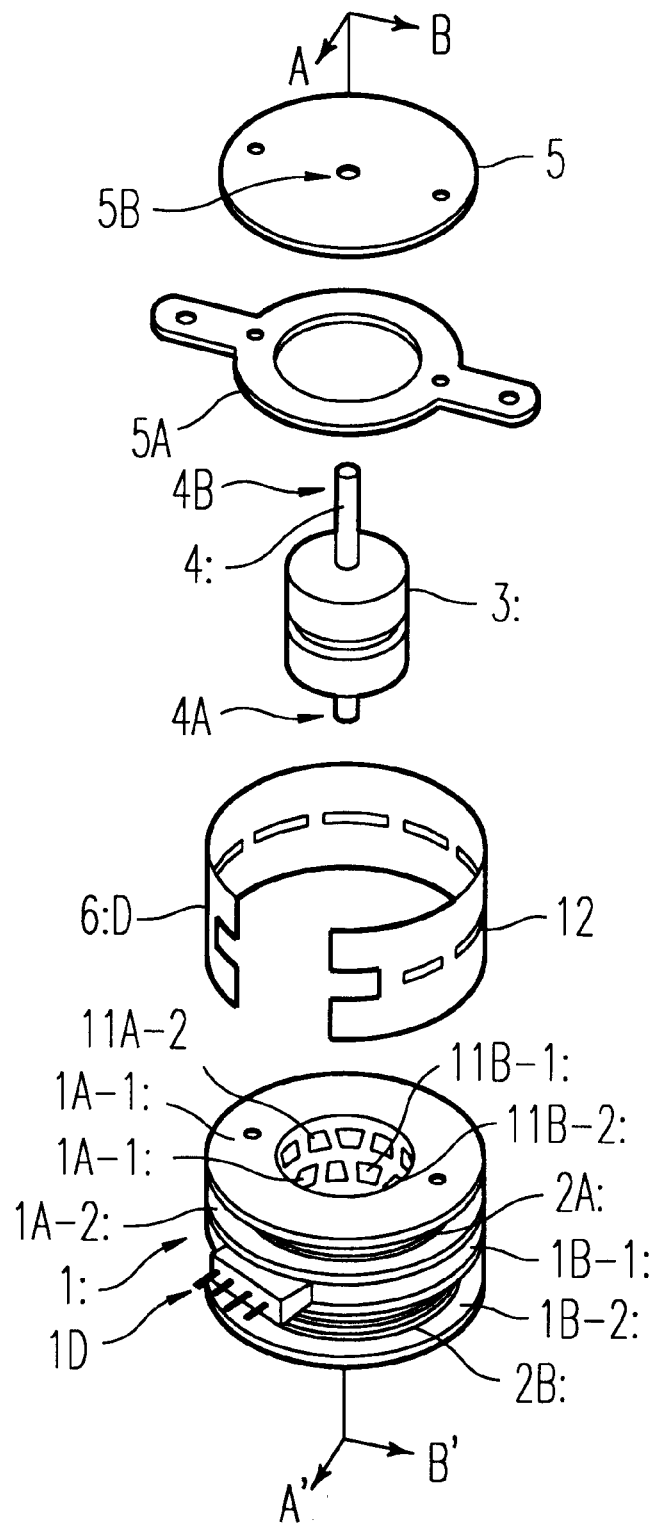
Figure 1E:
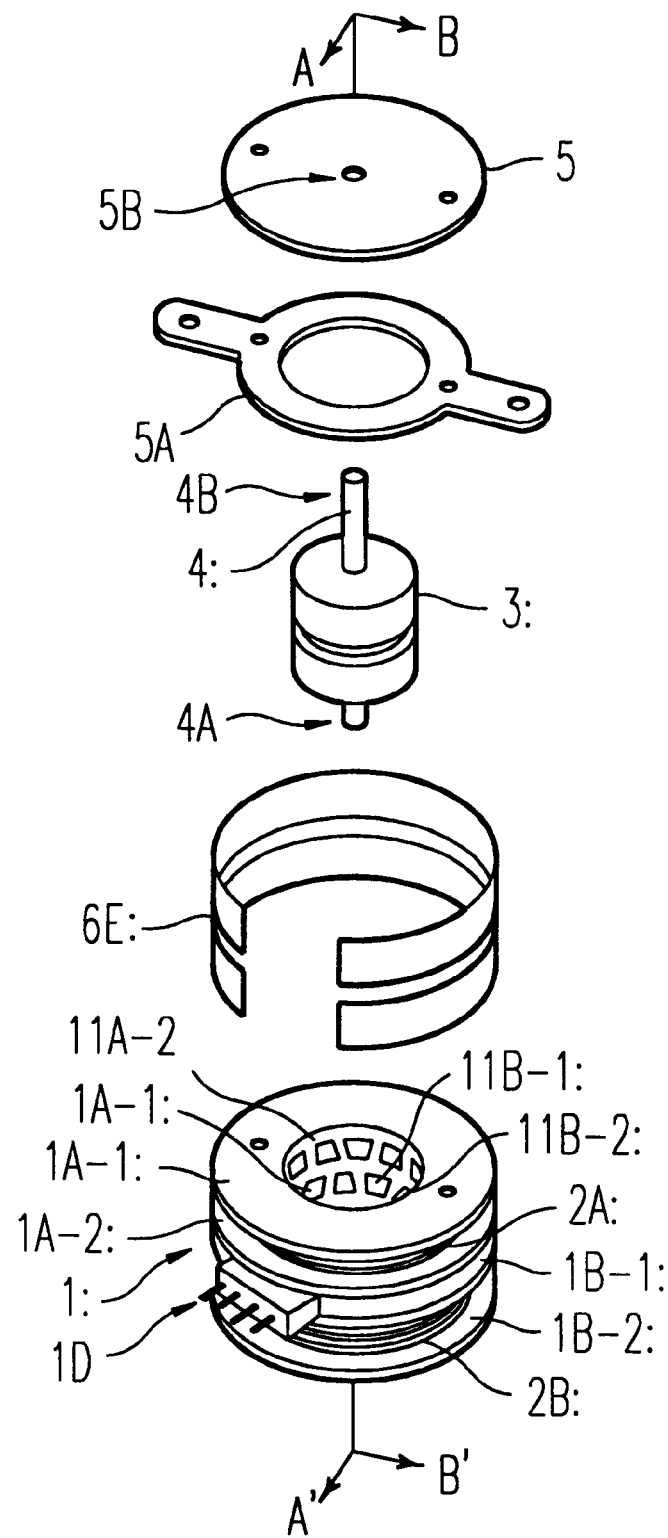
Figure 2:
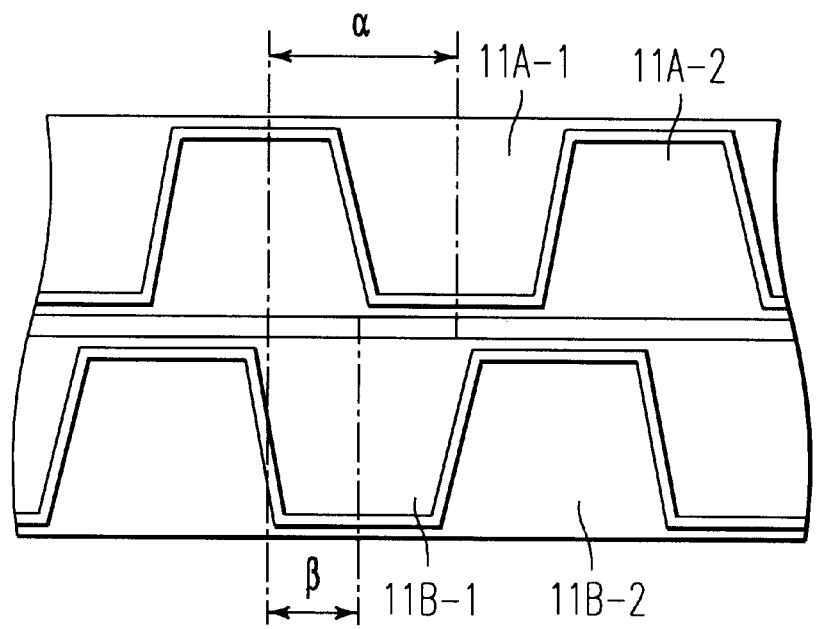
FIG. 2 is a view of the alignment of the pole teeth.

Referring now to the drawings, wherein like reference numerals designate identical or corresponding parts throughout the several views, and more particularly to FIG. 1 thereof, there is disclosed a stepping motor for a speed meter.

Figure 3:
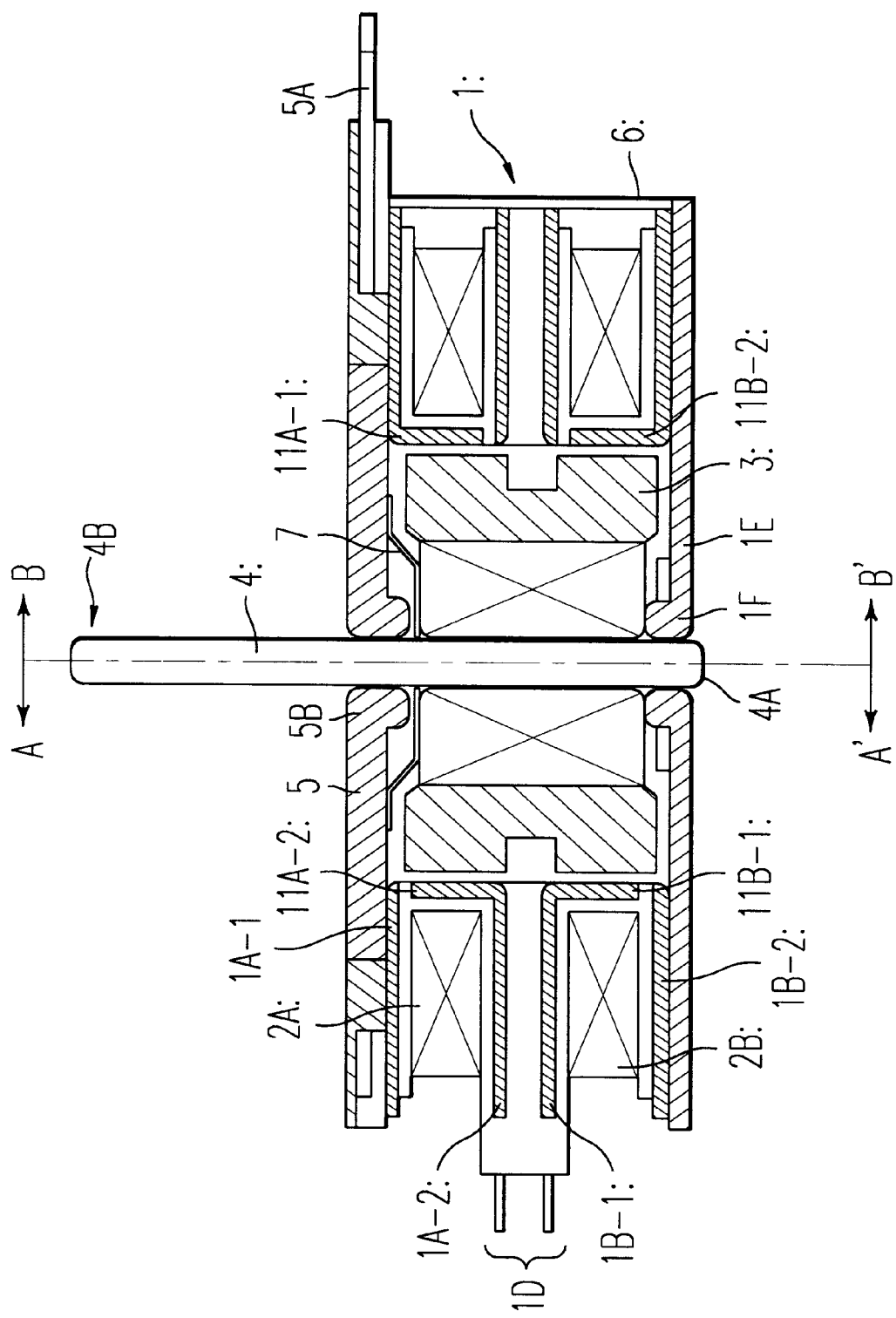
FIG. 3 is a cross-sectional view illustrating cross-sections AA' and BB' in FIG. 1(a).

In FIGS. 1 and 3, number 1 represents a cylindrical bobbin. The bobbin 1 is composed of a cylindrical magnetic yoke 1a-1 having vertically protruding pole teeth 11a-1, a cylindrical magnetic yoke 1a-2 having vertically protruding pole teeth 11a-2, a cylindrical magnetic yoke 1b-1 having vertically protruding pole teeth 11b-1 and a cylindrical magnetic yoke 1b-2 having vertically protruding pole teeth 11b-2, and these are stacked with a nonmagnetic spacer 1c. These yokes 1a-1, 1a-2, 1b-1 and 1b-2 have the same diameter and are coaxially stacked. A coil 2a is wound on the bobbin 1 between the yokes 1a-1 and 1a-2, and a coil 2b is wound on the bobbin 1 between the yokes 1b-1 and 1b-2.

In FIG. 3, the pole teeth 11a-1 and 11a-2 and the pole teeth 11b-1 and 11b-2 protrude so as to face each other, and are arranged while shifting the pole teeth 11a-2 and 11b-2 by a given angle a along the circumferential direction of the yokes 1a-1, 1a-2, 1b-1 and 1b-2. The angle α is determined by the magnetizing interval of the magnet 3. The pole teeth 11a-1 and 11b-1 and pole teeth 11a-2 and 11b-2 are also arranged while shifting the pole teeth 11b-1 and 11b-2 by a given angle β along the circumferential direction of the yokes 1a-1, 1a-2, 1b-1 and 1b-2.

The bobbin 1 has a hole bearing if near the center of the bottom cover 1e.

The magnet 3 is a column, and is magnetized at a given interval along the circumferential direction (not shown in the drawings). Numeral 4 represents a shaft to transmit the rotational force of the magnet 3, and is coaxially assembled with the magnet 3. A rotor consists of these components.

Numeral 5 represents a cover having a flange 5a and a hole bearing 5b near the center.

Numeral 6a and 6b represent elastic cylindrical magnetic members which press the bobbin other than a terminal 1d in the radial direction from the outside. The cylindrical magnetic members 6a and 6b formed of an elastic plate magnetic member so as to have a diameter smaller than the outer diameter of the yokes 1a-1, 1a-2, 1b-1, and 1b-2.

When assembling the stepping motor set forth in FIGS. 1 and 3, one end 4a of the shaft 4 is inserted into the hole bearing if to rotatably support the magnet 3 in the cavity of the bobbin 1. Also, the other end 4b of the shaft 4 is inserted into the hole bearing 5b to rotatably support the magnet 3. The opening of the bobbin 1 is closed with a cover 5. Then, the peripheries of the yokes 1a-1, 1a-2, 1b-1, and 1b-2 are covered with the elastic cylindrical magnetic members 6a and 6b which presses the yokes along the radial direction.

Numeral 7 represents a blade spring in the cavity in the bobbin center to suppress shaking of the shaft 4 which occurs after the rotor comprising the magnet 3 and the shaft 4 is assembled. The magnet 3 is pressed toward the bottom 1e of the bobbin 1 by means of the blade spring 7.

Since the cylindrical magnetic members 6a and 6b have a diameter smaller than the outer diameter of the yokes 1a-1, 1a-2, 1b-1 and 1b-2, it comes in tight contact with the peripheries of these yokes.

Strong magnetic circuits are generated between the cylindrical magnetic members 6a and 6b and the yokes 1a-1, 1a-2, 1b-1 and 1b-2. Therefore, precise torque formation and step angle can be achieved. Further, the cylindrical magnetic member 6b can form magnetic circuits just above and below the terminal because they have a cutout to pass a terminal of the bobbin through.

Figure 5A:
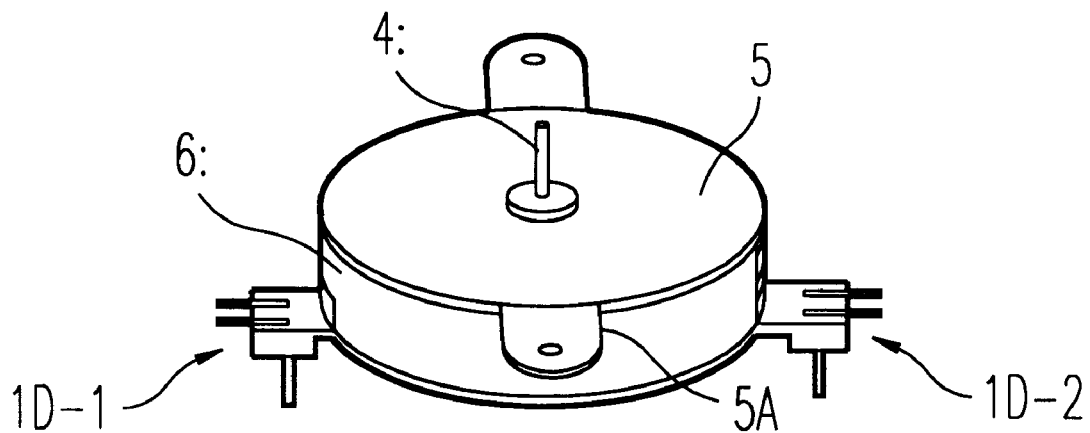
FIGS. 5(a) and 5(b) are isometric views illustrating the appearance of stepping motors in accordance with an embodiment of the invention.
Figure 5B:
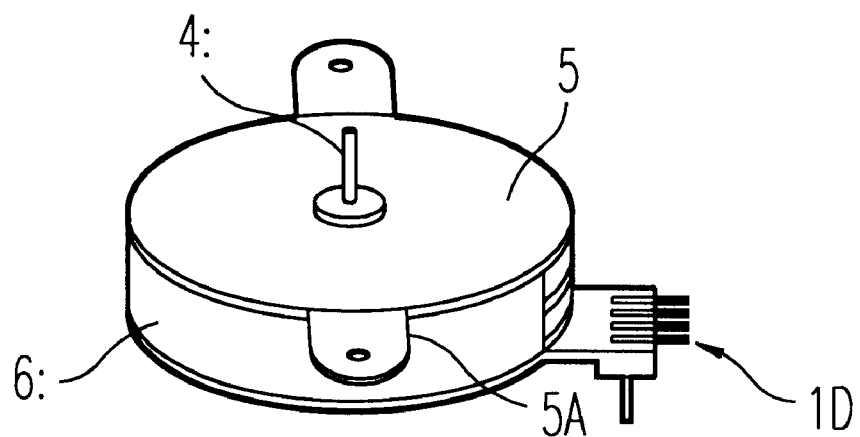
Figure 6:
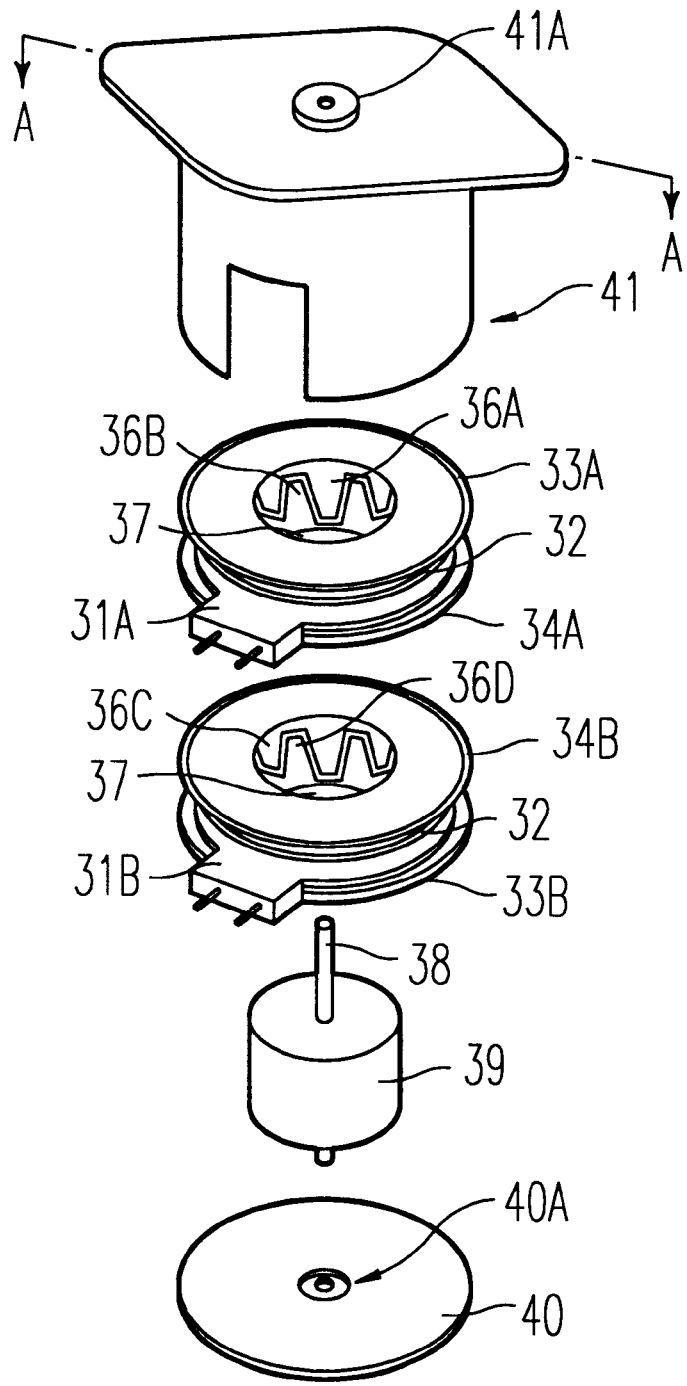
FIG. 6 is an assembly view illustrating a configuration of a conventional stepping motor.
Figure 7A:
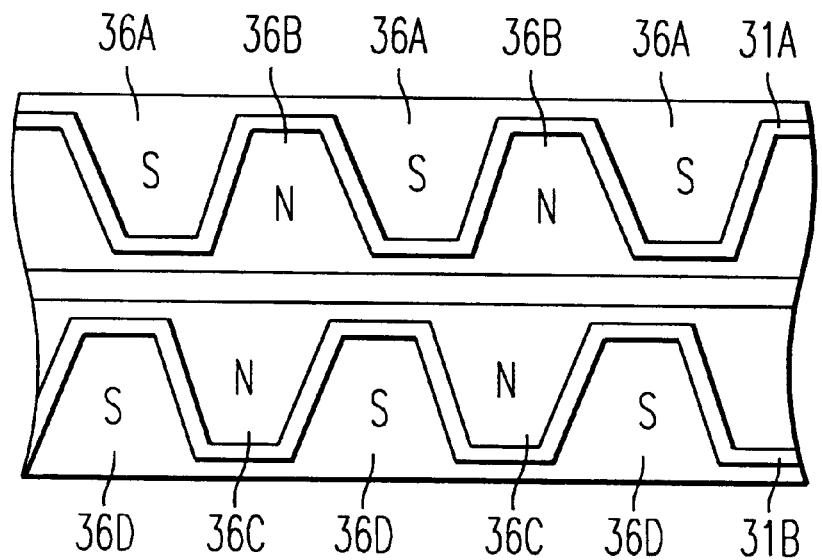
FIGS. 7(a) and 7(b) are views of the pole teeth when they have the same and opposite polarities, respectively.
Figure 7B:
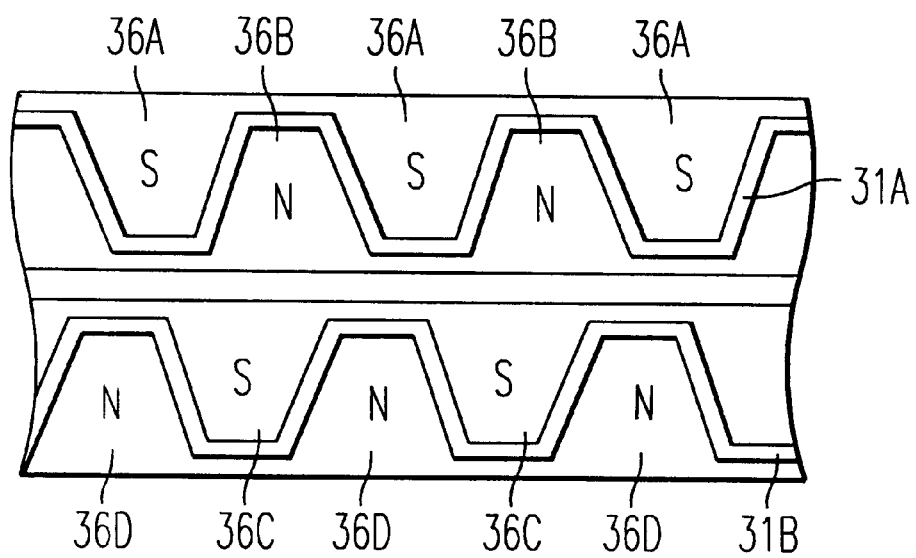

FIGS. 5(a) and 5(b) are isometric views illustrating the appearance of stepping motors in accordance with other embodiments of the present invention. A stepping motor in accordance with the present invention may have a configuration in which the stepping motor has a terminal 1d-1 to supply magnetizing current to the coil 2a and a terminal 1d-2 to supply magnetizing current to the coil 2b, with the terminal pins protruding from the bottom, as set forth in FIG. 5(a).

Figure 4:
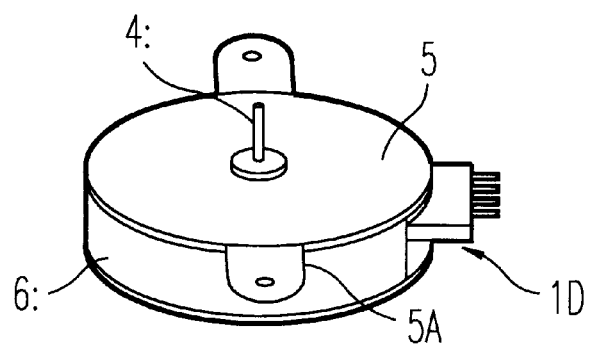
FIG. 4 is an isometric view illustrating an appearance of the stepping motor set forth in FIG. 1 or FIG. 3 after assembly.

Alternatively, terminal 1d may be provided in the center of the axis, as set forth in FIG. 4, or at a position on the bottom so that the terminal pins protrude from the bottom, as set forth in FIG. 5(b).

A stepping motor having a terminal set forth in FIG. 5(a) or 5(b) can be directly attached to a printed circuit board. Therefore, the stepping motor can be readily assembled without wiring and with a decreased number of fixing parts and assembly steps.

The cylindrical magnetic members 6c and 6d cover the periphery of the bobbin 1, and comes in contact with the yokes 1a-1, 1a-2, 1b-1 and 1b-2 to form independent magnetic circuits between the first yokes 1a-1 and 1a-2, and between the second yokes 1b-1 and 1b-2.

The cylindrical magnetic members 6c and 6d are provided with holes 12 near the center along the axis, that is, at a position, in which the inner yokes 1a-2 and 1b-1 face each other through a spacer 1c, so as to decrease the cross-sectional area of the connecting section 3 of the first yokes 1a-1 and 1a-2 with the second yokes 1b-1 and 1b-2 after assembling the stepping motor.

The holes 12 can decrease the amount of magnetic flux from the first yokes 1a-1 and 1a-2 to the respective second yokes 1b-1 and 1b-2, even if the pole teeth 11a-2 and 11b-1 are polarized with different polarities, due to change in the polarization pattern and a magnetic field is generated from pole teeth 11a-2 to the pole teeth 11b-1 through the cylindrical magnetic members 6c and 6d. Therefore, magnetic insulation between the first yokes and the second yokes can be enhanced, resulting in suppression of magnetic interference.

Accordingly, irregular rotation due to magnetic interference caused by change in the magnetizing pattern is prevented. Further, the cylindrical magnetic member 6d can form magnetic circuits just above and below the terminal because they have a cutout to pass a terminal of the bobbin through.

The cylindrical magnetic member 6e covers the periphery of the bobbin 1 so that a given space is provided in the center along the axis, that is, at a position in which the inner yokes 1a-2 and 1b-1 face each other through the spacer 1c.

Since the yokes 1a-1 and 1a-2 are not magnetically connected to the yokes 1b-1 and 1b-2, no magnetic interference occurs when the pole teeth 11a-2 of the yoke 1a-2 and the pole teeth 11b-1 of the yoke 1b-1 are pole with opposite polarities due to change in the polarizing pattern.

Accordingly, irregular rotation due to magnetic interference caused by change in the magnetizing pattern is prevented.

As set forth above, the present invention has the following advantages:

(a) In accordance with the invention, an elastic plate magnetic member, which covers the first and second yokes and is formed in a cylindrical shape having an inner diameter smaller than the outer diameter of the first and second yokes, readily comes in tight contact with the first and second yokes to form a strong magnetic circuit. The first yokes and the second yokes are integrally formed into a bobbin and a first pole teeth array of a first yoke and a second pole teeth array of a second yoke are arranged so as to have a given angle shift in the circumferential direction. Therefore, a stepping motor having high precision torque formation and stepping angle can be achieved at low production cost.

(b) In accordance with the invention, the cylindrical magnetic member is proved with a cutout to pass a terminal of the bobbin through. Therefore, the cylindrical magnetic member can form magnetic circuits just above and below the terminal, and a stepping motor having high precision torque formation and stepping angle can be achieved.

(c) In accordance with the invention, the connecting section which magnetically leads between the first yokes and the second yokes is narrowed since the cylindrical magnetic member is provided with holes to decrease the side surface area of the connecting section. Therefore, magnetic flux flow from one side of the yoke to the other side of the yoke is decreased, even if two facing inner yokes have opposite polarities due to change in the magnetizing pattern, thus magnetic interference between the first and second yokes can be suppressed, and irregular rotation can be reduced.

(d) In accordance with the invention, the magnetic member covering the yoke periphery is divided into two magnetic members, i.e., a first magnetic member covering the peripheries of the first yokes and a second magnetic member covering the peripheries of the second yokes, and these magnetic members are provided with a given space there between. Therefore, the first yokes and the second yokes are not magnetically connected to each other, magnetic interference between the first and second yokes can be suppressed, and irregular rotation can be reduced.

Obviously, numerous (additional) modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A stepping motor comprising:

a rotor comprising a column magnet and a shaft attached along an axis of the column magnet;

a bobbin comprising first yokes and second yokes, and first and second coils wound on said yokes, said bobbin covering said rotor; and a cylindrical elastic member covering said bobbin and pressing said first and second yokes along their radial directions from the outside, wherein said cylindrical magnetic member is a magnetic member provided with holes positioned along a given band between the inner yokes to decrease the side surface area of a connecting section between said first yoke and said second yoke.

2. A stepping motor according to claim 1, wherein said cylindrical elastic member has an inner diameter smaller than an outer diameter of said first and second yokes.

3. A stepping motor according to claim 1, wherein said cylindrical magnetic member is a magnetic member having a cutout to pass a terminal of said bobbin through.

4. A stepping motor comprising:

a rotor comprising a column magnet and a shaft attached along an axis of the column magnet;

a bobbin comprising first yokes and second yokes, and first and second coils wound on said yokes, said bobbin covering said rotor; and a cylindrical elastic member covering said bobbin and pressing said first and second yokes along their radial directions from the outside, wherein said cylindrical magnetic member is a magnetic member divided into a first cylindrical magnetic member to cover the periphery of said first yoke and a second cylindrical magnetic member to cover the periphery of said second yoke with a given gap there between.

5. A stepping motor according to claim 4, wherein said cylindrical elastic member has an inner diameter smaller than an outer diameter of said first and second yokes.

* * * * *

UNITED STATES PATENT AND TRADEMARK OFFICE
CERTIFICATE OF CORRECTION

PATENT NO. : 6,046,519
DATED : April 4, 2000
INVENTOR(S) : Hiroshi Hanazumi, et al.

It is certified that error appears in the above-identified patent and that said Letters Patent is hereby corrected as shown below:

Title Page, item [30], should read:

-- [30]   Foreign Application Priority Data

Apr. 19, 1996   [JP]   Japan .................. 8-098882
    Aug. 9, 1996    [JP]   Japan .................. 8-211745
    Aug. 14, 1996   [JP]   Japan .................. 8-214811

Signed and Sealed this

Twenty-first Day of August, 2001

*Attest:*

NICHOLAS P. GODICI
*Attesting Officer*   *Acting Director of the United States Patent and Trademark Office*